(12) United States Patent
Silverberg et al.

(10) Patent No.: US 12,643,304 B1
(45) Date of Patent: Jun. 2, 2026

(54) MATERIAL WITH PROISOTROPIC STRESS RESPONSE STRUCTURE

(71) Applicant: MULTISCALE SYSTEMS, INC., Worcester, MA (US)

(72) Inventors: Jesse Silverberg, Worcester, MA (US); Arthur Evans, Fresno, CA (US)

(73) Assignee: MULTISCALE SYSTEMS, INC., Worcester, MA (US)

( * ) Notice: Subject to any disclaimer, the term of this patent is extended or adjusted under 35 U.S.C. 154(b) by 0 days.

(21) Appl. No.: 18/012,047

(22) PCT Filed: Jun. 24, 2021

(86) PCT No.: PCT/US2021/038932
§ 371 (c)(1),
(2) Date: Dec. 21, 2022

(87) PCT Pub. No.: WO2021/263005
PCT Pub. Date: Dec. 30, 2021

Related U.S. Application Data

(60) Provisional application No. 63/044,646, filed on Jun. 26, 2020.

(51) Int. Cl.
*B32B 3/12* (2006.01)
*B32B 7/12* (2006.01)

(52) U.S. Cl.
CPC .................. *B32B 3/12* (2013.01); *B32B 7/12* (2013.01); *B32B 2250/40* (2013.01); *B32B 2307/54* (2013.01); *B32B 2307/558* (2013.01); *B32B 2605/08* (2013.01)

(58) Field of Classification Search
None
See application file for complete search history.

(56) References Cited

U.S. PATENT DOCUMENTS

| | | |
|---|---|---|
| 2007/0251170 A1 | 11/2007 | Uhlig et al. |
| 2016/0325520 A1 * | 11/2016 | Berger ...................... F16S 3/08 |
| 2019/0194943 A1 * | 6/2019 | Bingham .................. E04C 2/32 |
| 2019/0315086 A1 | 10/2019 | Hundley et al. |
| 2019/0381755 A1 * | 12/2019 | Tachi ....................... E04B 1/345 |
| 2020/0061980 A1 | 2/2020 | Pearson et al. |
| 2020/0114573 A1 * | 4/2020 | TenHOUTEN ....... B22F 3/1115 |

FOREIGN PATENT DOCUMENTS

| | | | | |
|---|---|---|---|---|
| CN | 108215393 A | * | 6/2018 | ........... B32B 15/095 |

OTHER PUBLICATIONS

Sun et al., machine translation of CN 108215393, Jun. 29, 2018 (Year: 2018).*

(Continued)

*Primary Examiner* — Mary I Omori
(74) *Attorney, Agent, or Firm* — CANTOR COLBURN LLP

(57) ABSTRACT

The present invention provides lightweight components that have improved energy absorption. The components of the invention comprise a core comprising a plurality of repeats of an open unit cell. Each unit cell comprises intersecting polygonal planes of material and open space. The plurality of open unit cells promote energy absorption by the component from any direction of impact.

28 Claims, 14 Drawing Sheets

(56) References Cited

OTHER PUBLICATIONS

Sarvestani et al., 3D printed meta-sandwich structures: Failure mechanism, energy absorpton and multi-hit capability, 2018 (Year: 2018).*

Tancogne-Dejean et al., 3D Plate-lattices: an Emerging Class of Low-Density Metamaterial Exhbiting Optimal Isotropic Stiffness, 2018 (Year: 2018).*

Ma et al., An origami-inspired structure with graded stiffness, Dec. 18, 2017 (Year: 2017).*

Isomax™: The world's first metamaterial to achieve the performance predicted by theoretical bounds, Feb. 21, 2017, UC Santa Barbara (Year: 2017).*

Sebastian Fischer, Aluminium foldcores for sandwich structure application: Mechanical properties and FE-simulation, Jan. 28, 2015 (Year: 2015).*

Silverberg et al., Using origami design principles to fold reprogrammable mechanical metamaterials, Aug. 8, 2014 (Year: 2014).*

Tung et al., An Algorithm of Rigid Foldable Tessellation Origami to Adapt to Free-Form Surfaces, 2019 (Year: 2019).*

Leanza et al., Active Materials for Functional Origami, 2023 (Year: 2023).*

Schenk et al., Geometry of Miura-folded metamaterials,Jan. 17, 2013 (Year: 2013).*

Filipov et al., Origami tubes assembled into stiff, yet reconfigurable structures and metamaterials, Aug. 7, 2015 (Year: 2015).*

Lin et al., Folding at the Microscale: Enabling Multifunctional 3D Origami-Architected Metamaterials, 2020 (Year: 2020).*

Grima et al. "Auxetic behavior from rotating squares." Journal of Materials Science Letters 19(17):1563-1565 (2000); Abstract only, 1 page.

International Search Report and Written Opinion for International Application No. PCT/US2021/38932; International Filing Date Jun. 24, 2021; Report Mail Date Oct. 2, 20211 (pp. 1-9).

Xiang et al. "Comparative analysis of energy absorption capacity of polygonal tubes, multi-cell tubes and honeycombs by utilizing key performance indicators." Materials & Design 89 (2016): 689-696.

* cited by examiner

117a

117b

105

117b

101

MATERIAL WITH PROISOTROPIC STRESS RESPONSE STRUCTURE

STATEMENT REGARDING FEDERALLY SPONSORED RESEARCH OR DEVELOPMENT

This invention was made with government support under National Science Foundation Award No. IIP-1913784 and NASA Contract No. 80NSSC20C0095. The government has certain rights in the invention.

TECHNICAL FIELD

The disclosure relates to materials with strong and light-weight structure.

BACKGROUND

The materials used to make vehicles such as trucks and aircraft are hoped to be strong enough to protect cargo and to withstand impacts. Unfortunately, strong and durable materials tend to be quite heavy. To make a material light enough for a small aircraft like a helicopter, or to make a light material to improve fuel efficiency in overland vehicles, typically involves compromising the strength of the material. For example, some materials use some variation of a corrugated material to save weight. However, corrugated panels are notoriously easy to bend along at least one axis—e.g., along the lines of corrugation. When such panels are used, for example, for trucks, simply bumping the truck into a nearby vehicle or crane can bend or fold the sides, reducing strength and introducing aerodynamic drag, which negates the significant gas cost savings that should otherwise be associated with lightweight materials. Some designers try to use fiberglass composites, but those materials also tend to have directions along which they fold or break easily. Also, the glass fibers in the composite are not particularly light, so trucks with fiberglass composite panels may still incur high fuel costs.

Aircraft—and in particular, smaller aircraft such as those lifted by rotors—particularly need lightweight materials. However, those materials must be strong, not only in the unfortunate event of a crash, but also for routine landings that can involve non-trivial shocks and impacts. Unfortunately, many materials used in aircraft, including honeycomb-based materials, are not good at absorbing shocks and impacts in all directions. Even honeycomb, fiber composites, or corrugated materials will typically have at least one axis along which they fold or compress quickly and easily. When a material collapses quickly under stress, it transmits the harmful impulse of that stress to its cargo. Whether the cargo is people or goods, the stress of such a shock can inflict significant damage.

SUMMARY

The present invention provides lightweight components that have improved energy absorption and impact protection that greatly improve the crash protection capabilities of aircrafts and other vehicles. The components achieve improved crash protection through a core comprising a plurality of repeats of an open unit cell. Each unit cell comprises intersecting polygonal planes of material and open space. In the component, the core can be a layer within a component comprising additional layers, such as cladding layers, for example forming a sandwich panel. The plurality of open unit cells promote energy absorption by the component from any direction of impact. Because the components can be used in the manufacture of aircraft paneling, the components greatly increase an occupant's chances of survival following a crash, thereby reducing the number of deaths caused by aircraft malfunctions each year.

The components may further comprise a second cladding layer extending over a second surface, opposed to the surface. Either the component comprising the core alone or the component comprising the cladding layers may form a panel. The component may be formed as a substantially rectangular panel or substantially curved panel, for example in the shape of panels used in aircraft frames.

Advantageously, the specific energy absorption of the component may be more isotropic than for a honeycomb-based panel of similar dimensions and density, for example a honeycomb-based panel with a core consisting of hexagonal tubes. The component may also have a higher crush force efficiency than for a honeycomb-based panel of similar dimensions and density with a core consisting of hexagonal tubes.

Additionally, because the component comprises unit cells comprising one or more of the polygonal planes, the polygonal planes of the unit cells may exhibit rigid body rotation before they or the material exhibits plastic deformation. As a result, the components are resistant to plastic deformation and sudden collapse from minimal impacts, for example from wear and tear during flights. The components can also absorb additional impact energy before plastic deformation occurs. In aspects of the invention, once sufficient impact energy for deformation occurs, the component irreversibly absorbs kinetic energy.

The plurality of open unit cells promote energy absorption by the component from any direction of impact. Advantageously, any one of the unit cells, in isolation, may have at least one anisotropic material property. The unit cells may be oriented within the component to provide different material properties to the component than the material properties of the any one unit cell. The unit cells may be oriented within the component to provide at least one isotropic material property to the component. For example, the material property may be at least one material property selected from the list consisting of compression modulus, shear modulus, Poisson's ratio, yield strength, crush strength, crush force efficiency, or thermal conductivity.

The component may further have a yield strength relative to the yield strength of the material over the same volume that follows the formula:

$$\delta_{ys}(\rho^*/\rho_s)^x$$

wherein $\delta_{ys}$ is the yield strength of the material over the same volume, $\rho^*$ is the effective density of the component, $\rho_s$ is the density of the of material over the same volume, and x has a value between 1 and 2.

The core may comprise a mixture of open unit cells of different shapes. For example, the core may comprise a plurality of repeats of different shapes. The unit cells may also comprise different materials or may comprise the same material.

The component, core, unit cells, and cladding layers may comprise a material comprising a metal, polymer, fibrous pump, carbon-fiber reinforced plastic, glass-fiber reinforced plastic, carbon-fiber reinforced metal, glass-fiber reinforced metal, ceramic, or otherwise a multimaterial composite The cladding layers may comprise a different material than the core material. The cladding layers may each comprise different materials from one another.

In aspects of the invention the core is coupled to the cladding layer. For example, the core may be coupled to the cladding layer by a fusing process. The core may be coupled to the cladding layer by adhesion.

The components, core, and unit cells can be formed by any suitable manufacturing process. For example, the core may comprise a plurality sheets that are non-planar (e.g., stamped) and then stacked and attached to form the unit cells. The components, core, and unit cells may be formed in an additive process or molding process. The additive process may be one of 3D printing or injection molding and the molding process may be one of thermoforming, vacuum forming, or pressure forming. The components, core, and unit cells may be formed by folding or cutting the material to form the core. The components, core, and unit cells may be formed by a mix of processes comprising one or more of additive processes, molding processes, folding processes, or cutting processes in any order.

The components and panels of the invention provide a lightweight material with improved energy absorption. The components and panels may be used as panels for trailers or semi-trailer trucks, wall-panels, ceiling panels, floor paneling, or subfloor paneling.

Advantageously, because the components and panels of the invention are lightweight, they may be used in manned and unmanned vehicle paneling, for example in aircrafts. The components and panels of the invention may be used in helicopter paneling, small aircraft paneling, and commercial airline paneling.

DETAILED DESCRIPTION

The present invention provides lightweight components that have improved energy absorption and impact protection that greatly improve the crash protection capabilities of aircrafts and other vehicles. Components of the present invention comprise a core comprising a plurality of repeats of an open unit cell, each unit cell comprising intersecting polygonal planes of material and open space wherein the plurality of open unit cells promote an isotropic specific energy absorption of the component.

The repeats of an open unit are a class of architecture structures that can be programed with a wide range of properties through geometric alteration of the repeating unit cells. The design yields components that combine: (i) the lightweighting needed for aerospace materials with (ii) the crash protection capabilities of heavier composite structures.

Advantageously, the core comprises a plurality of repeats of an open unit cell, with more than one copy of the open unit cell. An open unit cell is a volume of space comprising both open space and a material. The open unit cell itself may be any shape, for example substantially tetrahedral, substantially cubical, or substantially curved.

Each unit cell comprises intersecting polygonal planes of the material. A polygon is a two-dimensional or three-dimensional figure with a finite number of edges or sides that form a closed shape. A polygonal plane is a substantially flat shape, having a significantly larger width and length than thickness. Multiple polygonal planes can together form a larger three-dimensional shape in which multiple planes are in parallel or intersect. Each unit cell of the invention comprises intersecting polygonal planes of material, thereby forming a three-dimensional shape with open space where the polygonal planes are not present. The open space does not comprise the material. An open space may comprise a gas, for example air, or may have no matter present within the open space.

Figure 1:
FIG. 1 depicts an aspect of an open unit cell of the invention.

FIG. 1 depicts an open unit cell and core of the invention. Components of the present invention comprise a core 105 comprising a plurality of repeats of an open unit cell 117, each unit cell comprising intersecting polygonal planes 121 of material 125 and open space 129 wherein the plurality of open unit cells promote an isotropic specific energy absorption of the component.

Figure 2:
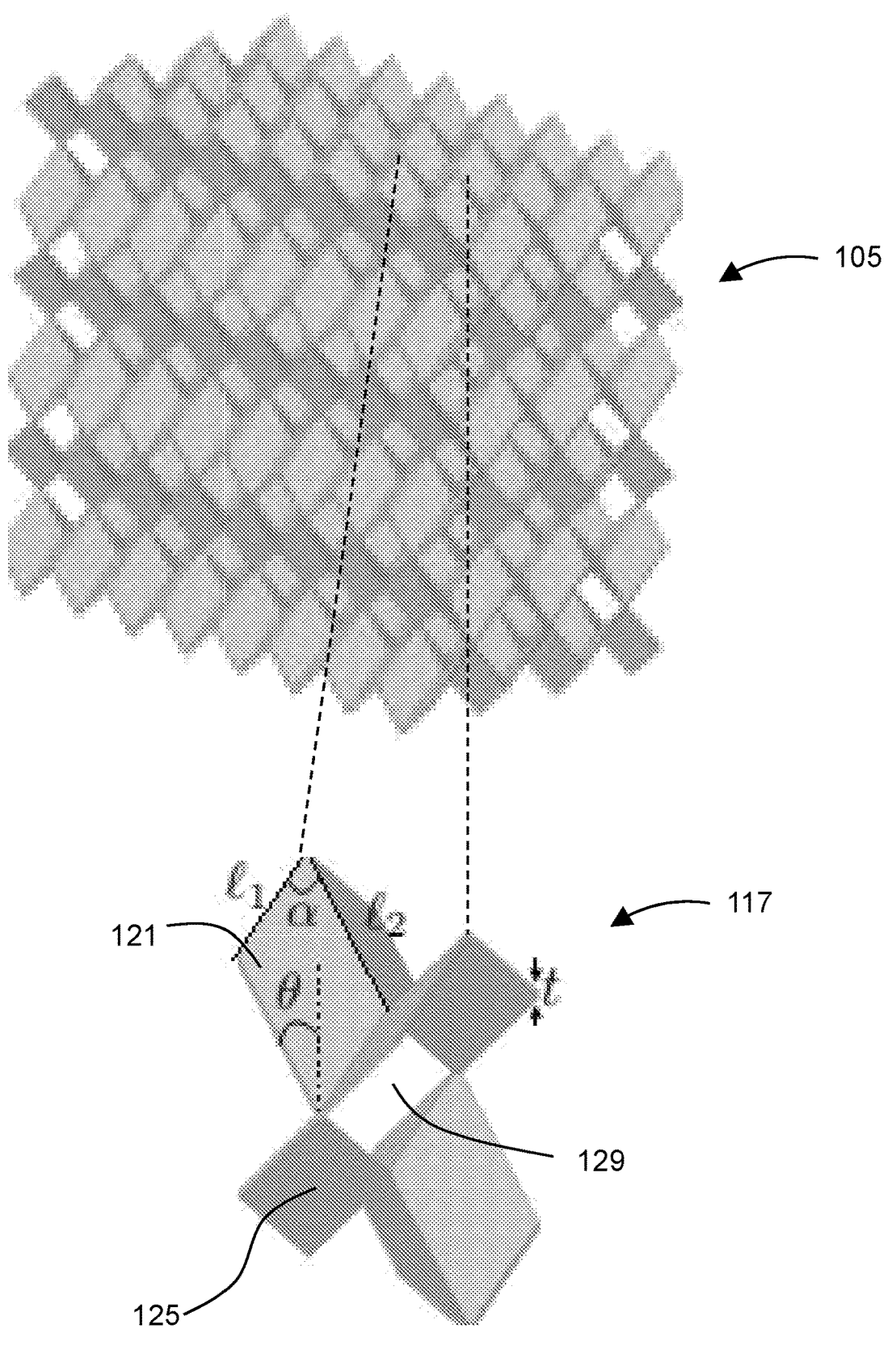
FIG. 2 depicts an aspect of an open unit cell of the invention.

FIG. 2 depicts another aspect of an open unit cell and core of the invention. Components of the present invention comprise a core 105 comprising a plurality of repeats of an open unit cell 117, each unit cell comprising intersecting polygonal planes 121 of material 125 and open space 129 wherein the plurality of open unit cells promote an isotropic specific energy absorption of the component.

Advantageously, the intersecting polygonal planes of material and open space of the open unit cells may comprise a variety of configurations.

Figure 3:
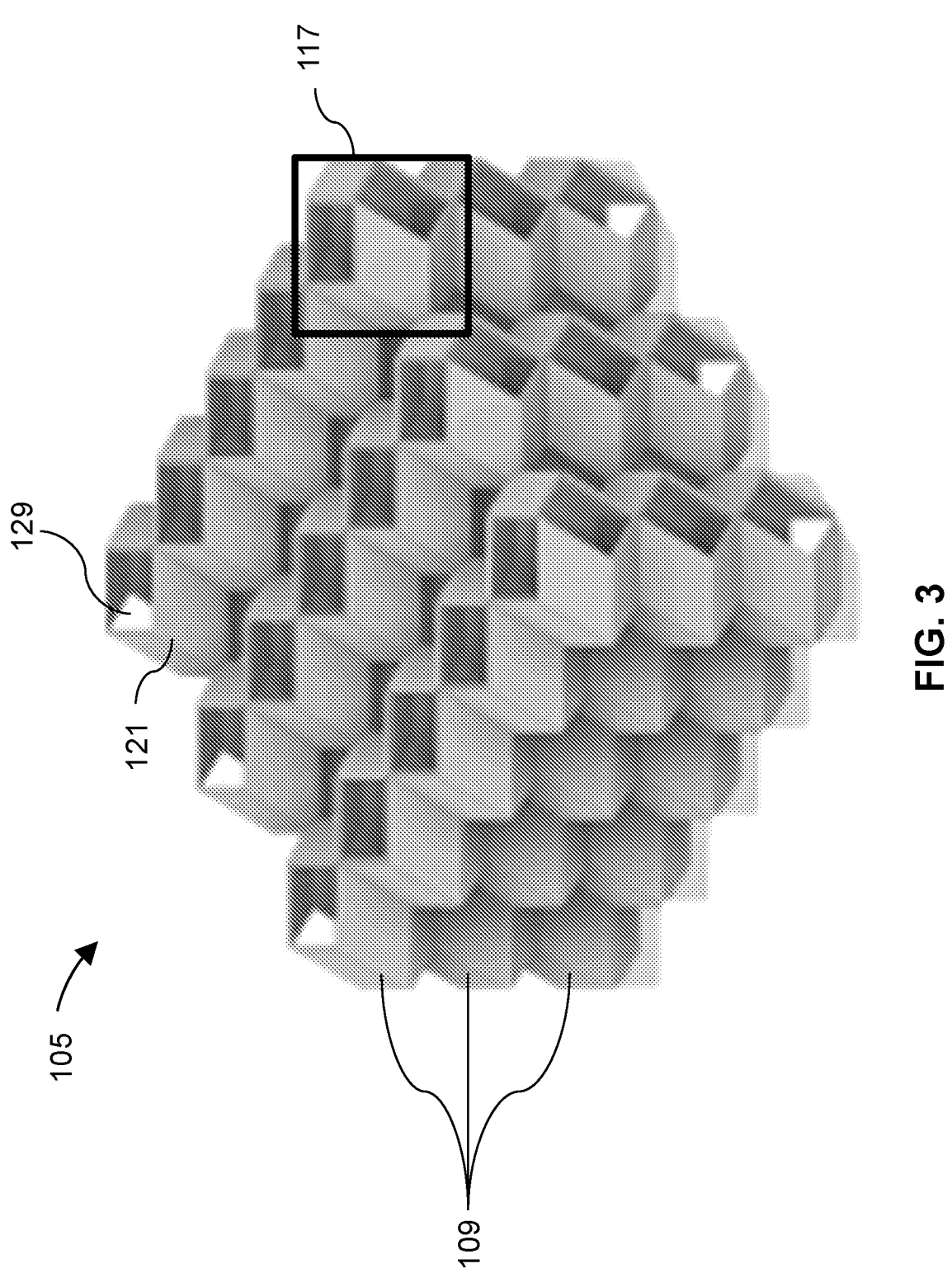
FIG. 3 depicts an aspect of a plurality of open unit cells of the invention.

FIG. 3 depicts an "Eggbox" configuration of the polygonal planes of material and open space of open unit cells of the invention. As shown, components of the present invention comprise a core 105 comprising a plurality 109 of repeats of an open unit cell 117, each unit cell comprising intersecting polygonal planes 121 of material and open space 129 wherein the plurality of open unit cells promote an isotropic specific energy absorption of the component. The configuration of open unit cells creates the core of the component. The configuration is highly compressible in two directions and has a large stiffness when loaded in a third direction.

Figure 4:
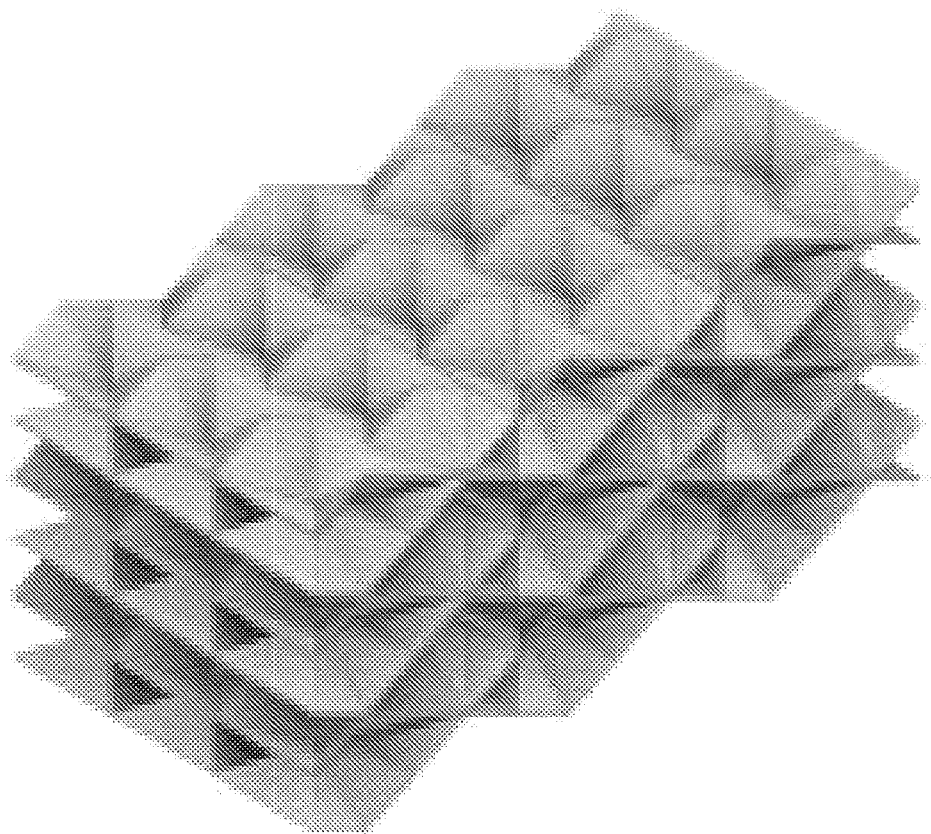
FIG. 4 depicts an aspect of a plurality of open unit cells of the invention.

FIG. 4 depicts a "Waterbomb" configuration of the polygonal planes of material and open space of the open unit cells of the invention. This configuration yields a core and component with a high stiffness-to-weight, high stiffness overall, and a very low density.

Figure 5:
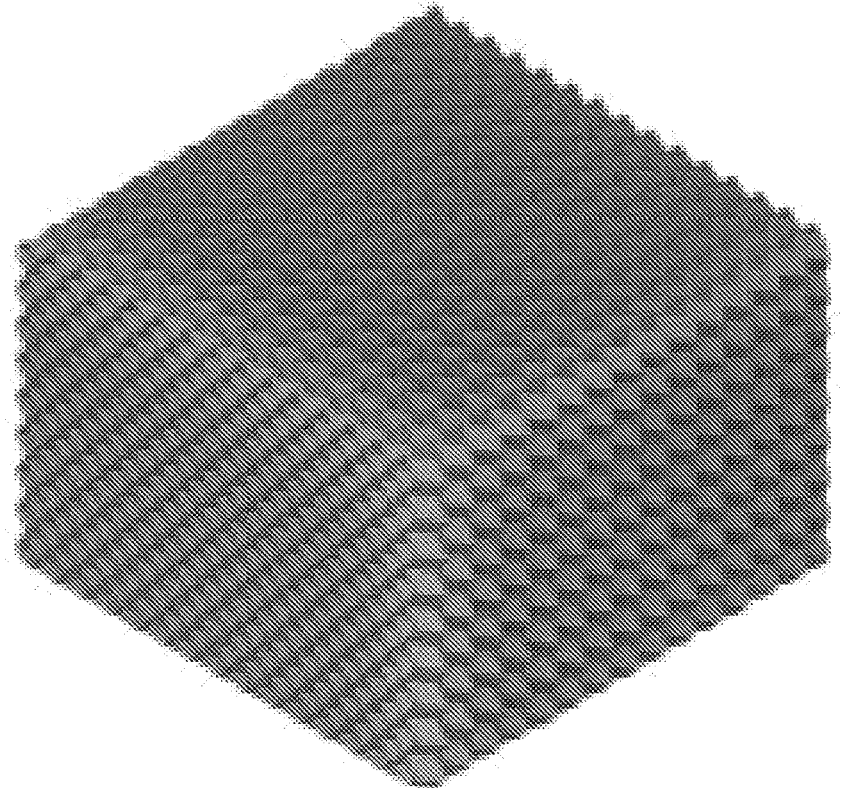
FIG. 5 depicts an aspect of a plurality of open unit cells of the invention.

FIG. 5 depicts a "Miura-ori" configuration of the polygonal planes of material and open space of the open unit cells of the invention. The configuration may be manufactured from a variety of materials. The configuration may be manufactured from stacked materials. The configuration may be manufactured using flat sheets or additively. The design parameters may also be varied to yield a range of anisotropic stiffness material properties to each unit cell.

Figure 6:
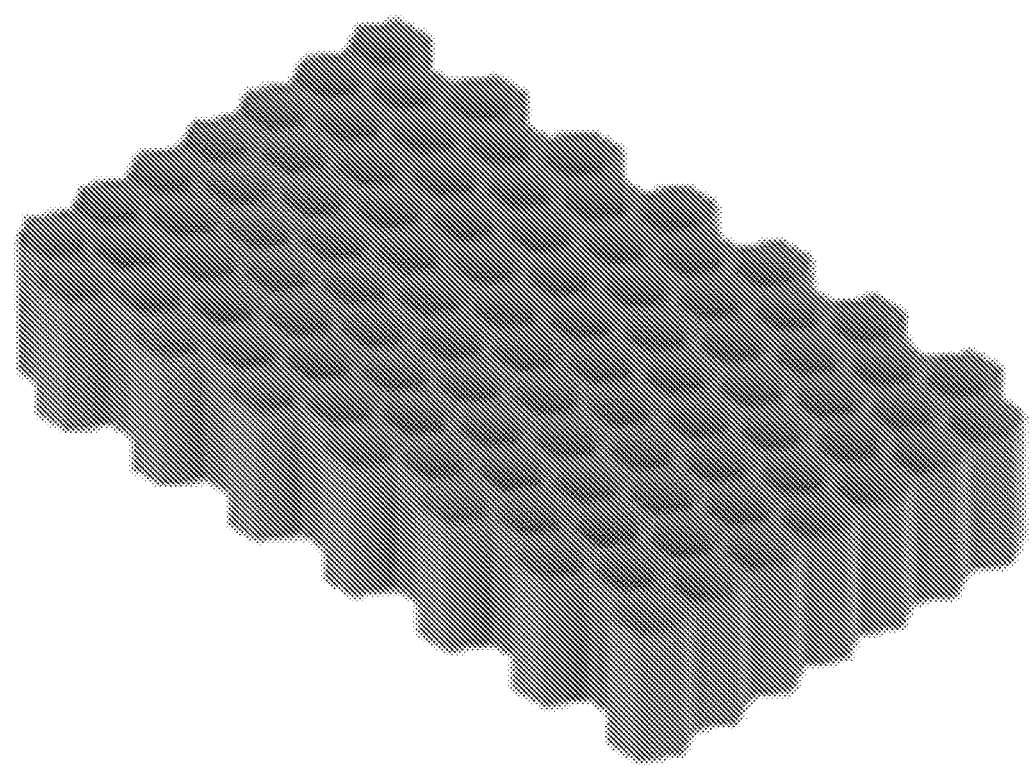
FIG. 6 depicts an aspect of a plurality of open unit cells of the invention.

FIG. 6 depicts a "topological metacomb" configuration. This configuration provides intersecting polygonal planes that provide a hexagonal structure with webbing incorporated into the hexagonal structure to create an elastically polarized material. The configuration may provide directional stiffness despite comprising homogenous unit cells. The configuration may be capable of retaining its mechanical properties even when damaged. The configuration may cause one edge of the structure be stiff, while the opposite side is compliant.

The core comprises a plurality of repeats of an open unit cell. The core can be a layer within a component comprising additional layers, such as cladding layers. The core can take any shape, for example a substantially rectangular or substantially curved shape. The core may take a substantially spherical shape.

Figure 7:
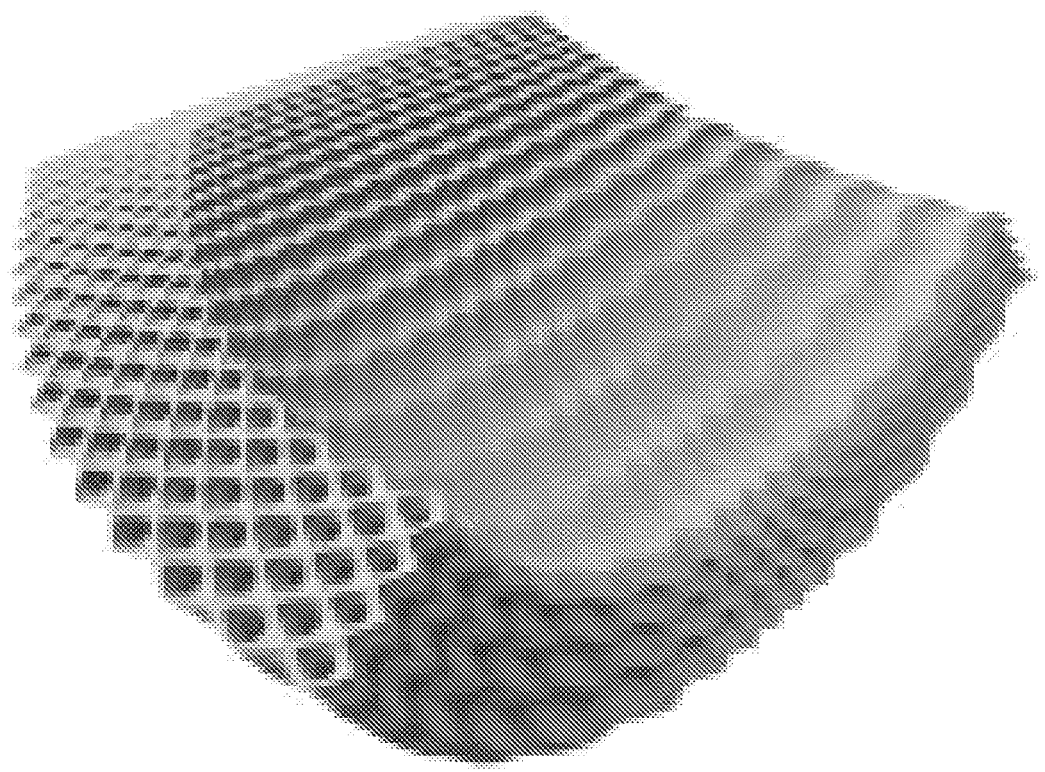
FIG. 7 depicts an aspect of the core of the invention in a substantially curved shape.

FIG. 7 depicts an aspect of a plurality of open unit cells of the invention. As shown, the core of the invention may have a substantially curved shape.

The unit cells may comprise any known material that forms the shape of the unit cells. For example, the material may comprise a metal, plastic, fibrous pump, carbon-fiber reinforced plastic, glass-fiber reinforced plastic, carbon-fiber reinforced metal, glass-fiber reinforced plastic, ceramic, or otherwise a multimaterial composite.

A metal is an elemental metal, for example aluminum or iron, or a metal alloy comprising a combination of metals or a combination of metals combined with one or more other elements, for example cast iron or stainless steel. A plastic is a synthetic or semi-synthetic organic polymer, frequently derived from petrochemicals, for example polyethylene or PVC. Glass-fiber is a material consisting of numerous fine fibers of glass, a crystalline amorphous solid typically formed from silica or quartz. Fiber-reinforced plastic is a composite material comprising the plastic reinforced with fibers, such as glass fibers. A ceramic is a material comprising metal or non-metal compounds that have been shaped and then hardened by heating to high temperatures, for example porcelain. The material may also be a multimaterial composite of multiple materials.

Figure 8:
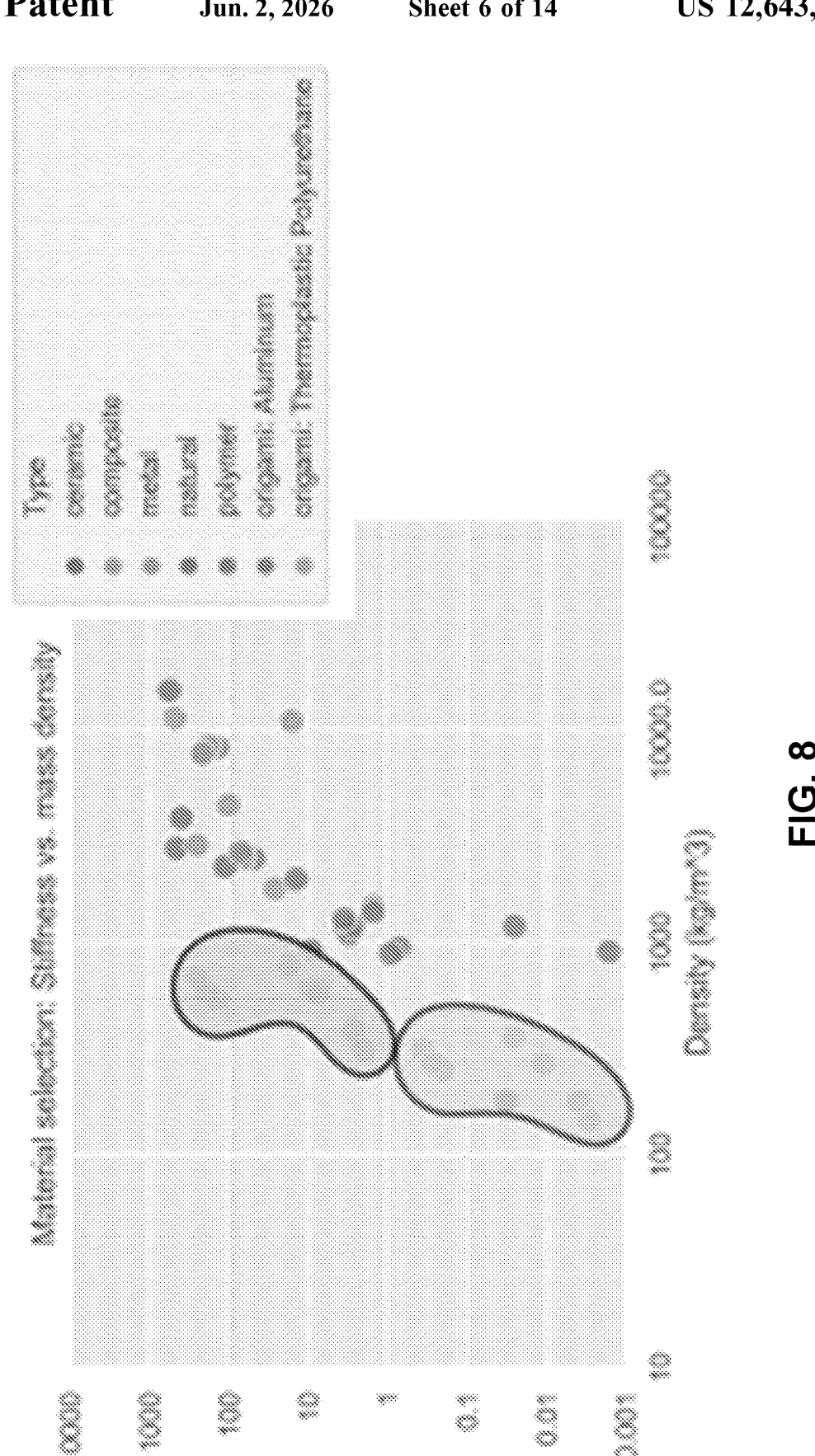
FIG. 8 is a graph for material selection for the repeating unit cells of the core of the components.

FIG. 8 is a graph for material that may be used in the repeating unit cells of the core of the components. The graph shows optimal stiffness (as measured by Young's Modulus) plotted against mass density. As shown, cellular materials are generally lighter than the base materials they comprise and have stiffness that spans a range of several orders of magnitude.

Figure 9:
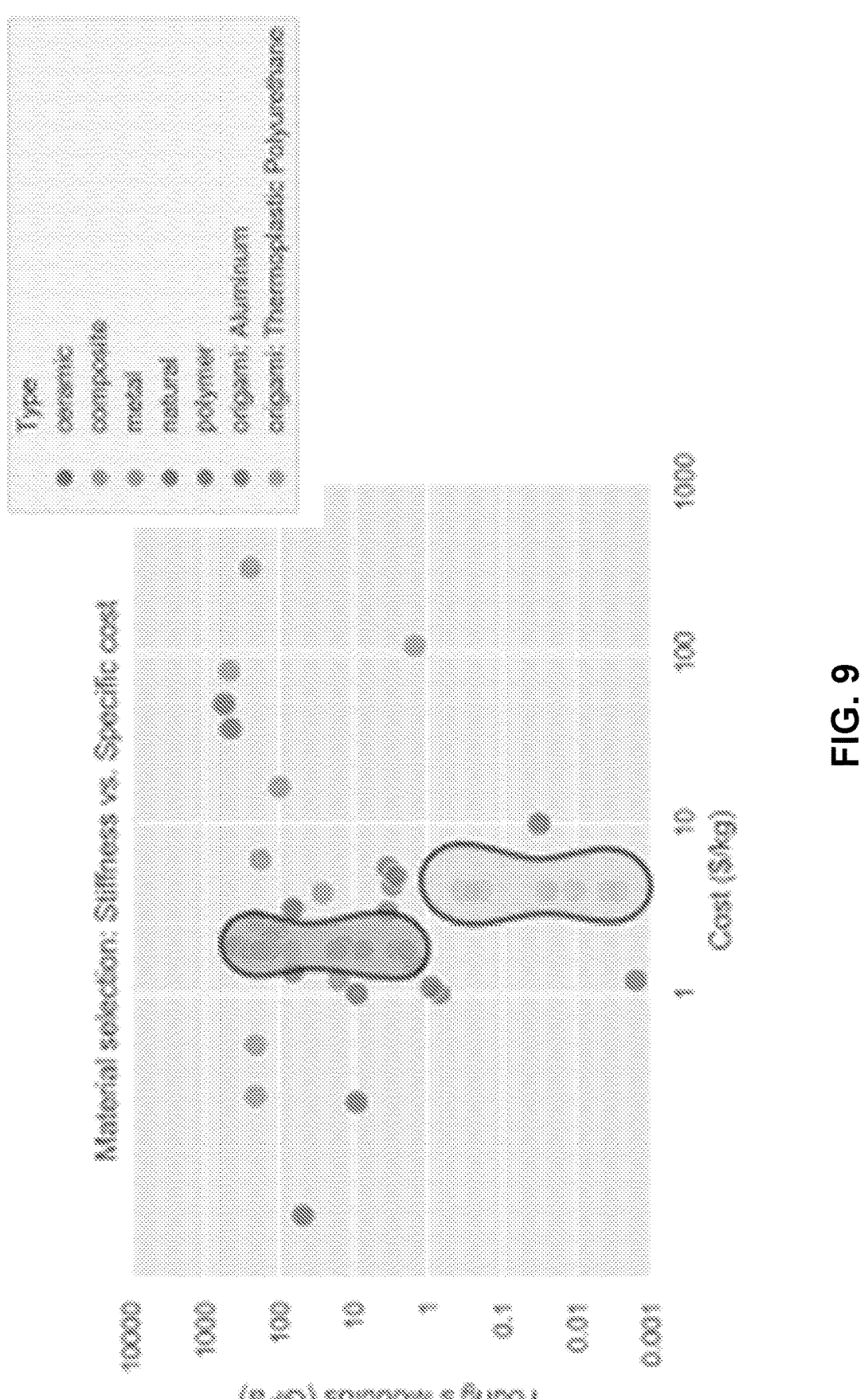
FIG. 9 is a graph for material selection for the repeating unit cells of the core of the components.

FIG. 9 is a graph for material that may be used in the repeating unit cells of the core of the components. The graph shows optimal stiffness (as measured by Young's Modulus) plotted against minimal cost. As depicted, the range of properties of the core achieves a wide range of properties independent from the properties of the material itself. This provides a low-cost, non-chemical modification of the physical properties of the core.

The core may comprise a mixture of open unit cells comprising different intersecting polygonal planes of material and open space. The core may comprise two sets of repeating open unit cells. The core may comprise a plurality of repeating unit cells and additional individual cells comprising different intersecting polygonal planes than the unit cells that comprise the plurality of repeating unit cells. The core may comprise a mixture of open unit cells of different shapes. For example, the core may comprise a plurality of repeats of substantially tetrahedral open unit cells and additional repeating or non-repeating cubical unit cells. Unit cells may also comprise different materials or may comprise the same material.

Figure 10A:
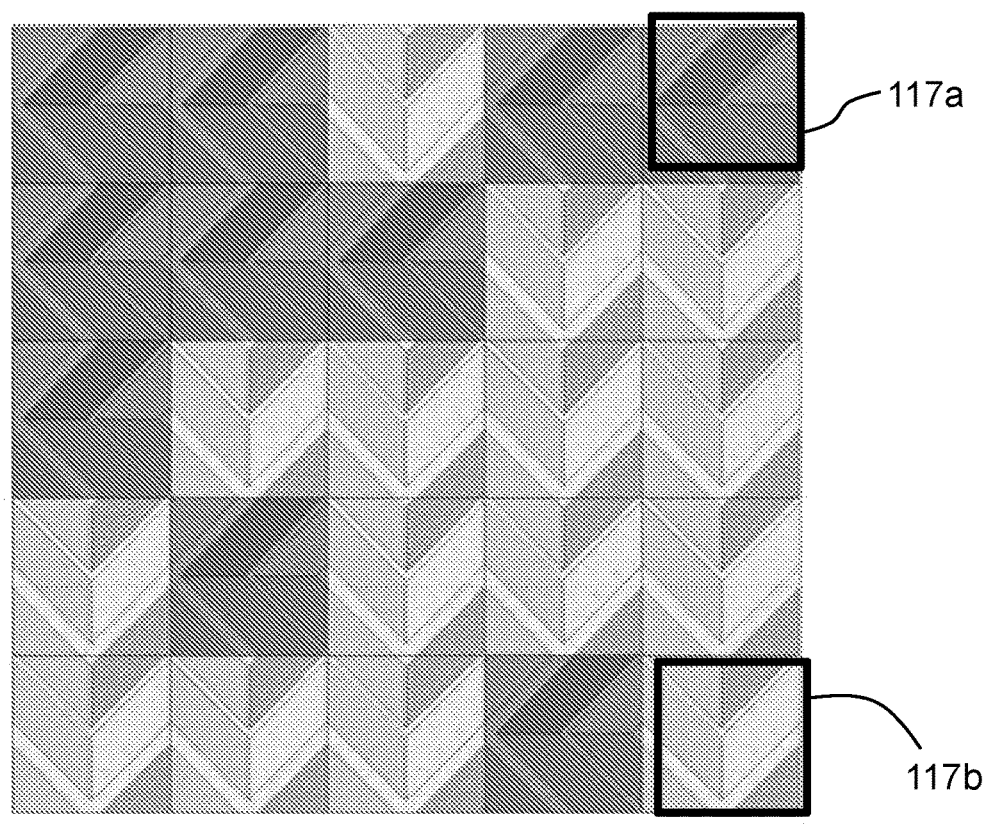
FIG. 10A depicts a top view of the plurality of open unit cells of the invention.

FIG. 10A depicts a top view of the plurality of open unit cells of the invention comprising a mixture of open unit cells. As shown, the core 105 comprises a first set of repeating open unit cells 117a and a second set of repeating open unit cells 117b. The intersection polygonal planes of the first set 117a are different than the intersection polygonal planes 117b of the second set. Advantageously, the mixture of open unit cells in the core can be selected to promote isotropy for the component. The mixture of open unit cells in the core can be selected to promote one or more material properties for the component.

Figure 10B:
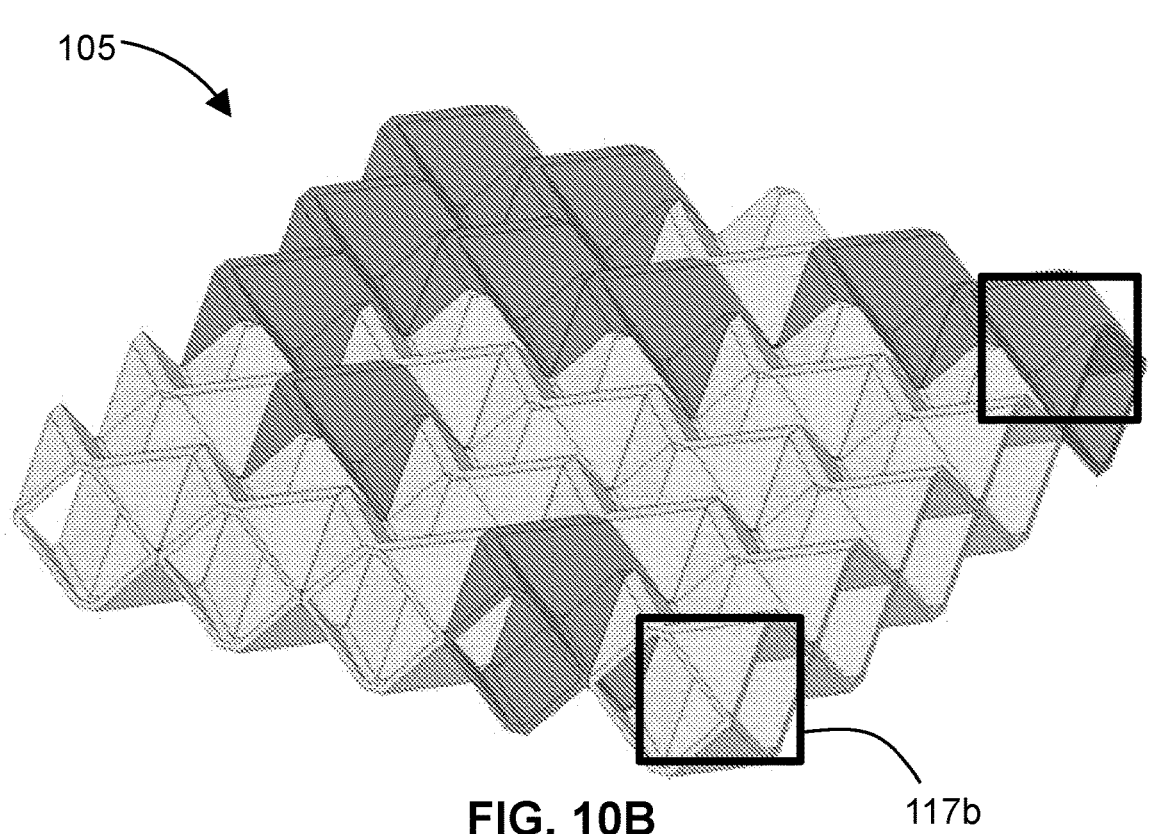
FIG. 10B depicts a perspective view of the plurality of open unit cells of the invention.

FIG. 10B depicts a perspective view of the open unit cells of the invention.

Advantageously, the plurality of open unit cells may together provide a surface to the core. The surface may be a substantially flat surface. The component may further comprise a cladding layer extending over the surface of the core, providing a cladding layer and a core layer to the component.

Figure 11:
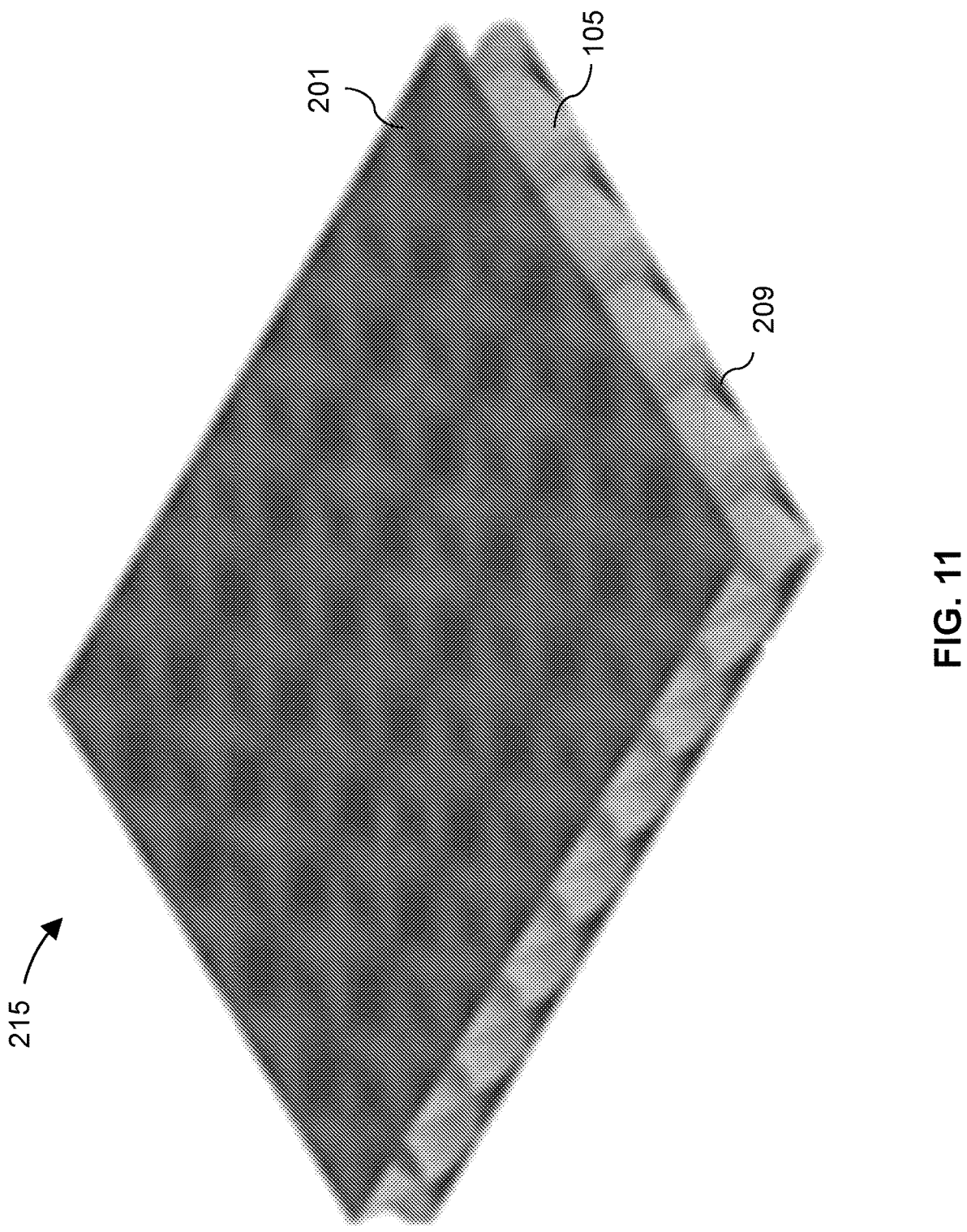
FIG. 11 depicts an aspect of a component of the invention with a cladding layer.

FIG. 11 depicts an aspect of the invention comprising a core 105. The component further comprise a cladding layer 201 extending over the surface of the core The plurality of open unit cells may together provide a second surface to the core. The component may further comprise a second cladding layer 209 extending over the second surface. The surface and second surface may be on opposing sides of the core. The plurality or open unit cells may together provide additional surfaces to the core. The surface may further comprise additional cladding layers extending over the additional surfaces. The cladding layer, second cladding layer, and core layer may together form a sandwich panel in which the core is disposed between the first cladding layer and the second cladding layer. Each cladding layer may comprise the same material as the materials comprising the core or may comprise a different material than the core material. The component may be formed as a substantially rectangular panel 215 or as a curved or spherical panel.

The cladding layer may comprise a different material than the core material or may comprise the same material as the core material. For example, the core may comprise a polycarbonate plastic material and the cladding may comprise a metal material.

The core may be coupled to the cladding layer. The core may be coupled to the cladding layer by being physically connected. The core may be coupled to the cladding layer by a fusing process. A fusing process is a process in which two material are bonded. A fusing process may be advantageous where the materials in the core layer and cladding layer are similar, for example both being metal or metallic or both being plastics, and bonded to one another by heat. The core may be coupled to the cladding layer by adhesion. Adhesion is the process by which two materials resist separation from one another. Adhesion may be facilitated by an adhesive agent, for example glue or cement. Adhesion may be advantageous where the materials in the core layer and cladding layer are dissimilar, for example a plastic core and a metal cladding layer.

Advantageously, the plurality of open unit cells of the component promote an isotropic specific energy absorption of the component, including components that comprise cladding layers.

An isotropic property is one in which the property has the same value when measured in different directions. Specific energy absorption (SEA) is the amount of energy absorbed per unit mass for a material, structure, or component. Promoting an isotropic specific energy absorption means that the specific energy absorption of the component is more isotropic. For example, the component may not be entirely isotropic, but may have increased isotropy for specific energy absorption. The component may be quasi-isotropic or nearly-isotropic.

Honeycomb-based structures are structures that comprise an array of hollow cells formed between thin vertical walls, most frequently columnar or hexagonal in shape. Honeycomb-based materials provide relatively high out-of-plane compression properties and out-of-plane shear properties. Honeycomb-based materials are not known for providing high in-plane compression or shear properties. Honeycomb-based materials have been used in panels and sandwich panels, for example in aircrafts and rockets. For example, honeycomb-based materials have seen wide usage in aerospace applications because of a large stiffness-to-weight ratio. However, honeycomb-based materials exhibit a large peak stress upon crushing, which greatly limits the protection honeycomb-based materials provide when dealing with an impact or crash. Additionally, conventional honeycomb-based materials suffer a catastrophic loss of impact absorption capability when stressed in-plane. To address some of these issues, pre-crushing honeycomb-based materials and asymmetric honeycomb constructions may be used to improve out-of-plane conformal bending. These changes, however, introduce trade-offs that reduce the load bearing and energy bearing capabilities of honeycomb-based materials.

Honeycomb materials are described in U.S. Pat. Nos. 5,670,001, 5,139,596, 6,877,774, and 7,988,809, the contents of each of which are incorporated herein in their entirety. Panels and sandwich panels comprising a honeycomb-based core are described in U.S. Patent Application Publication No 2018-0141302 and PCT International Publication No. WO/2018/152180, the contents of each of which are incorporated herein in their entirety.

Testing the full spectrum crashworthiness of structures and panels may incorporate several physiological metrics for assessing injury in a crash scenario. These include Head Injury Criterion (HIC), Neck Injury Criterion (NIC), lumbar load injury assessment reference values (IARVs), and the Dynamic Response Index (DRI). These individual metrics are often targeted towards a specific Anthropomorphic Test Device (ATD), and thus involve highly specialized crash scenarios in order to be benchmarked against different components and materials.

To condense the large number of potential physiological metrics and design constraints, several properties may be quantified to measure the variability of performance in individual components.

Specific energy absorption (SEA) is one of the most commonly reported metrics and potentially the most informative metric for crush performance. Specific energy absorption may be calculated as the integrated area under the load compression curve divided by the mass of the material to which force is applied. A large specific energy absorption, for example greater than 20 kJ/kg, means that a lot of energy has been absorbed by the material on impact or that the material absorbing the impact is lightweight. Often, high SEA materials, such as honeycomb based materials, are functional only in one direction and have low SEA in other directions. Advantageously, the components of the invention may provide a specific energy absorption that is more isotropic than that provided by honeycomb-based panels of similar dimensions and density, for example honeycomb-based panels with a core consisting of hexagonal tubes, and off-axis impacts are more effectively dissipated.

The components of the invention may also provide a higher crush force efficiency than provided by honeycomb-based panels of similar dimensions and density, for example honey-comb panels with a core consisting of hexagonal tubes. Crush force efficiency (CFE) is a measure of the ratio of the crush stress to peak stress. Crush force efficiency may be calculated as the crush force divided by compression force. When the crush force efficiency is 1, impact decelerations are mitigated. When crush force efficiency is smaller or approaches 0, sudden changes in acceleration can cause damage. While SEA determines the amount of energy absorbed per mass, if the material/device has a large peak stress (and thus a low CFE), the material is likely to injure a human occupant since the deceleration forces will be large. The peak stress corresponds to the highest impulse that transmits to a cargo or vehicle or material carried by or made of the material of components of the disclosure. The disclosed geometries and the unit cells minimize that peak force with a consequence that is parallel to the rationale for crumple zones in automobiles. If a body is travelling at a certain velocity and comes to a stop, the amount of potential injury correlates to impulse which involves the change in velocity over the amount of time of the change. Because change in time is in the denominator, a body without any crumple zone will have part of the impulse where the denominator approaches zero, and the energy transfer is very high. Materials of the disclosure neutralize that peak stress to thereby minimize impulse meaning that the materials, or vehicles or objects made with those materials, can absorb the shock of an impact with minimal trauma to cargo.

Figure 12:
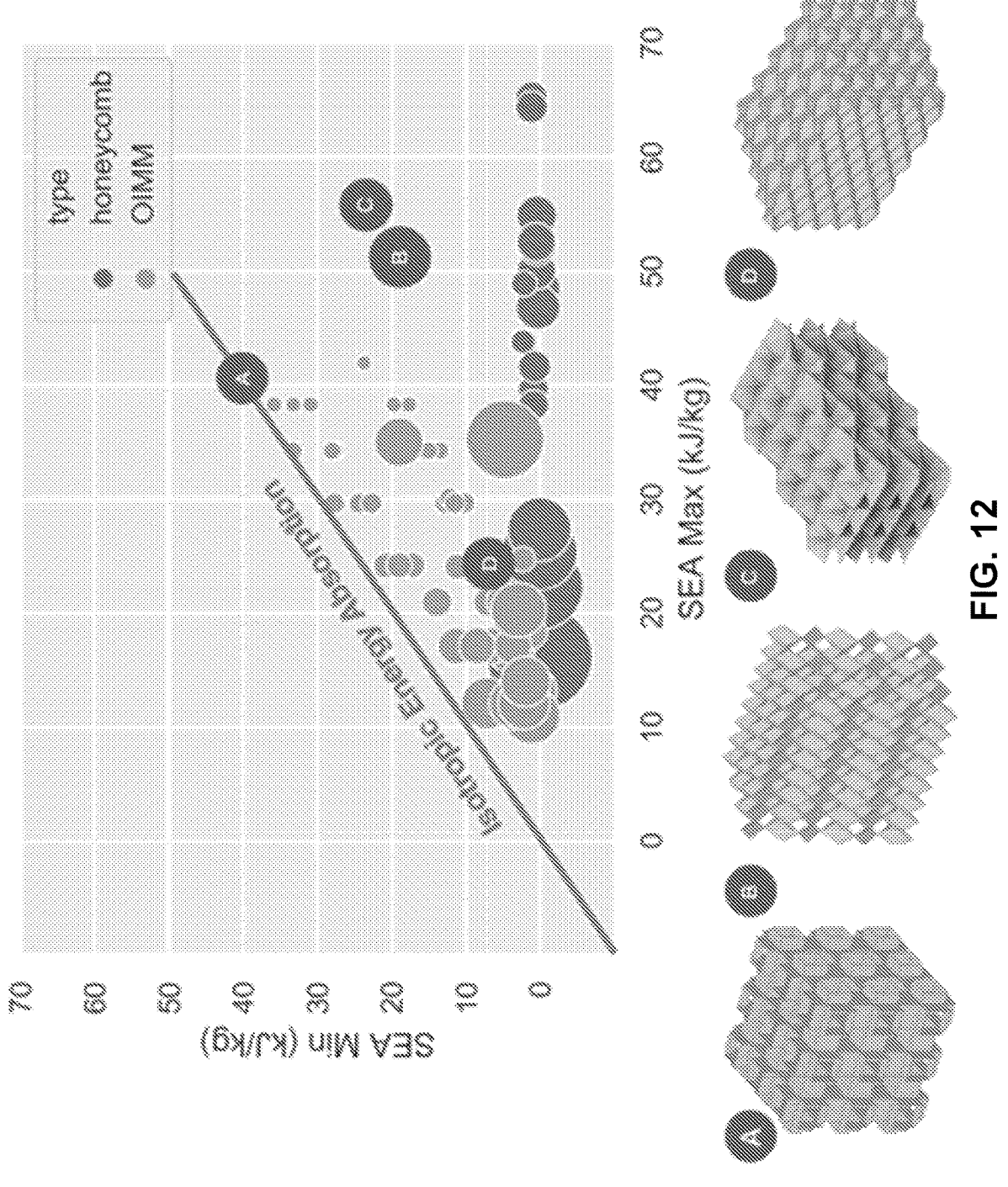
FIG. 12 is a graph of the specific energy absorption of exemplary components of the invention compared to honeycomb-based materials.

FIG. 12 is a graph of the specific energy absorption (SEA) of specific components A through D of the invention as well as additional embodiments of components of the invention (abbreviated "CoI") compared to honeycomb-based materials. Data points are scaled inversely according to the density of the material, with larger dots indicating lower densities. The red line corresponds to isotropic limit, the maximum achievable isotropy. The components of the invention achieve isotropic energy absorption. Component A is a "Discrete Schwarz Primitive" (DSP) component design that achieves isotropic absorption and a high maximum absorption. The DSP component also achieves near perfect CFE. Component B is an "Eggbox" configuration. The Eggbox configuration achieves a large maximum SEA and isotropic energy absorbance. The Eggbox design is advantageously manufactured through a cut/fold/stack process. Component C is a "Waterbomb" configuration. Component C achieves a large maximum SEA and isotropic energy absorbance. The Waterbomb design is advantageously manufactured through a cut/form/stack process. Component D depicts a "Miura-ori" configuration. Component D achieves a large CFE and greater isotropic energy absorbance than honeycomb-based materials. The Miura-ori design is advantageously manufactured from a fold/form/stack process.

Standard metrics for crash efficiency also include specific strength and specific modulus. Specific strength describes the fracture toughness of a material over its density. Specific modulus describes the stiffness of a material over its density. Specific strength and specific modulus may be mutually exclusive with SEA. The components of the invention may also provide a higher specific strength and/or specific modulus than provided by honeycomb-based panels of similar dimensions and density, for example honey-comb panels with a core-consisting of hexagonal tubes.

When the component is under stress, one or more of the polygonal planes of the unit cells may also exhibit rigid body rotation before they exhibit plastic deformation. A rigid body is a solid body in which deformation is zero or so small that it can be neglected. Rigid body rotation is a motion that rotates a structure around a fixed axis that is perpendicular to a fixed plane. Plastic deformation is the permanent distortion of a material that occurs when the material is subjected to tensile, compressive, bending, or torsion stress that exceeds its yield strength and causes the material to elongate, compress, buckle, bend, or twist.

Advantageously, one or more polygonal planes of the unit cells of the component may begin to rotate around a fixed axis with minimal to no deformation prior to any permanent distortion of the unit cells. Minimal force applied to the component may result in rigid body rotation of polygonal planes of the unit cell without any permanent deformation. When the component is under stress, one or more of the polygonal planes of the unit cells may also exhibit rigid body rotation before they exhibit plastic deformation.

Figure 13:
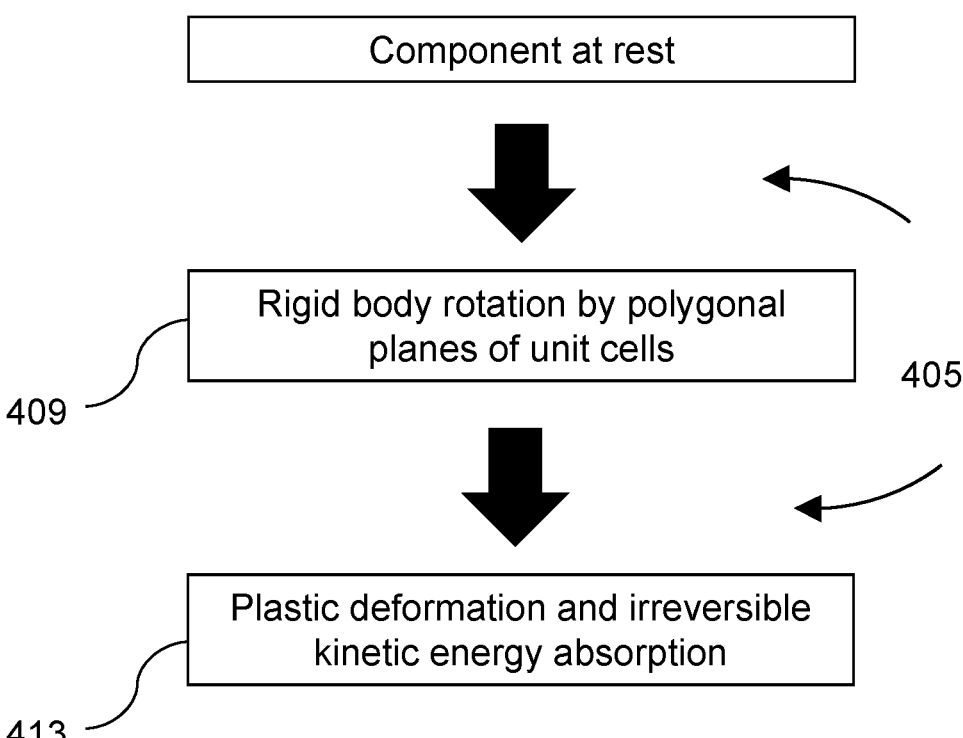
FIG. 13 is a flow chart of the action of the component as increasing stress is applied to the component.

FIG. 13 is a flow chart depicting increased stress 405 placed upon a component. As the amount of stress increases, the polygonal planes of the unit cells first exhibit rigid body rotation 409 by rotating around an axis without deformation. As additional stress is applied, the component undergoes plastic deformation 413, which results in irreversible kinetic energy absorption.

Any one of the unit cells used in the invention may in isolation have at least one anisotropic material property. A unit cell in isolation means that the properties of the unit cell are considered without taking into consideration the impact of any additional materials or unit cells. An anisotropic property is a property that has a different value when measured in different directions.

Honeycomb-based panels display anisotropic properties in that the properties differ when measured in-plane and out-of-plane.

Advantageously, the unit cells used in the present invention may be oriented within the component to provide different material properties to the component than the material properties of any one unit cell. Unit cells that have an anisotropic property may be oriented to together provide an isotropic property to the component. The component may comprise unit cells oriented within the component to provide at least one isotropic material property to the component.

Figure 14:
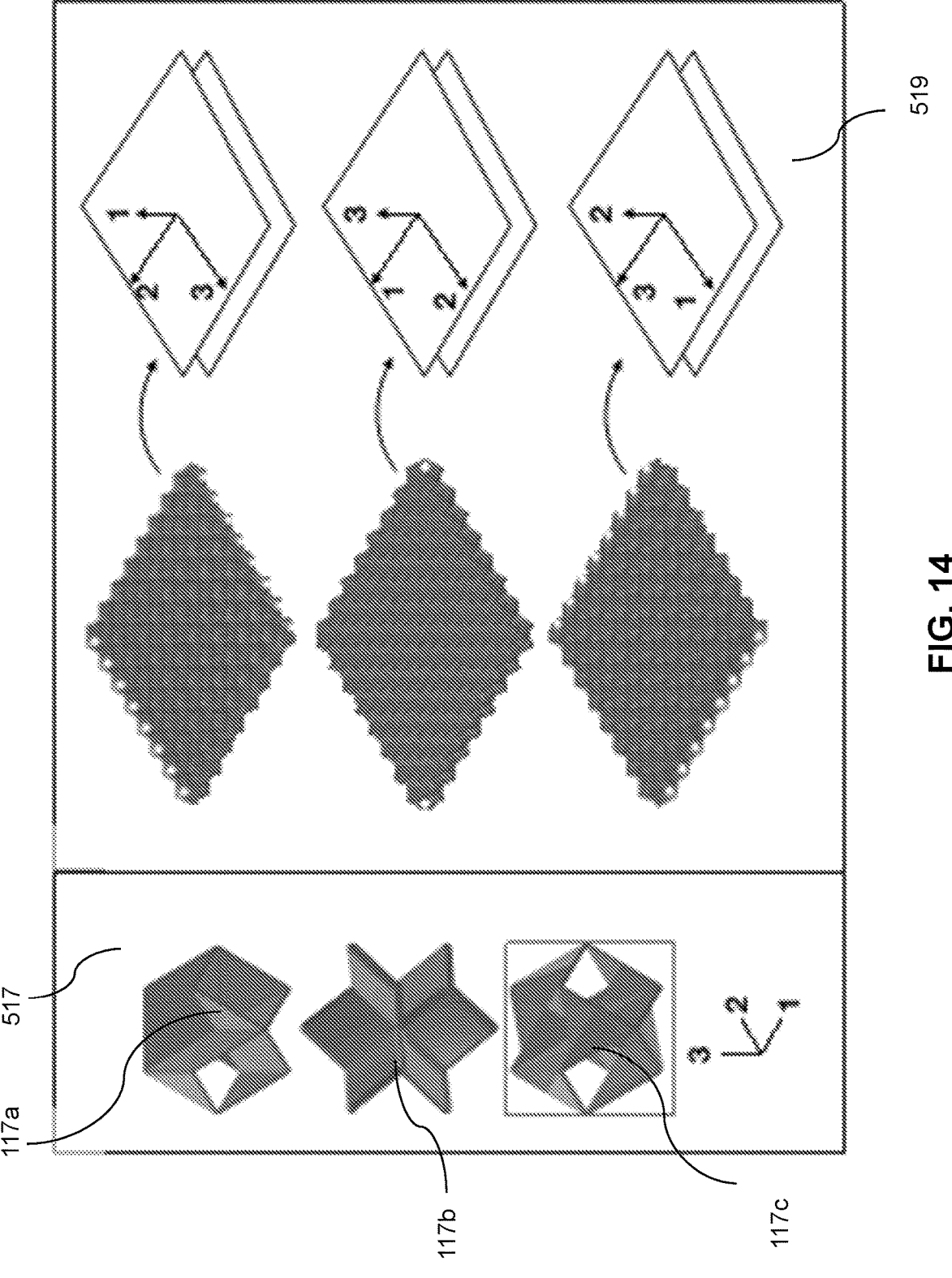
FIG. 14 depicts unit cells of the invention oriented in different orientations.

FIG. 14 depicts unit cells 117a, 117b, and 117c to form three different cores. Each unit cell is oriented 517 to provide a surface and shape to the core of the component 519, resulting in three different core geometries.

The material properties provided to the component by the unit cells may be any one of the material properties selected from the list consisting of compression modulus, shear modulus, Poisson's ratio, yield strength, crush strength, crush force efficiency, or thermal conductivity.

Compression modulus, shear modulus, and Poisson's ratio measure the stiffness of a material. Compression modulus describes a structure's strain response to stress in the direction of the stress, measured as the amount of force applied per unit area of the structure divided by the change in volume of the structure. Shear modulus describes a structure's response to stress parallel to opposing surfaces of the structure, measured as the ratio of shear stress to shear strain. Poisson's ratio describes a structure's strain response to stress in the direction perpendicular to the stress, measured as the negative ratio of transverse strain to axial strain.

Yield strength describes the stress at which a specific amount of plastic deformation of a structure is produced. Advantageously, the component of the invention may have a yield strength relative to the yield strength of the corresponding materials comprising the component over the same volume that follows the formula:

$$\delta_{ys}(\rho^*/\rho_s)^x$$

wherein $\delta_{ys}$ is the yield strength of the materials over the same volume, $\rho^*$ is the effective density of the component, $\rho_s$ is the density of the of materials over the same volume, and x has a value between 1 and 2.

Density of a material is the mass of the material over the volume of the material. Effective density is the density of a structure that comprises voids, porosities, or spaces within the structure or that comprises different materials combined. Effective density is the mass of material actually present in the structure over a given volume. Components of the invention may have an effective density that is lower than the density of the material over the same volume. For example, the effective density may be $\frac{1}{10}$th the density of the material.

Crush strength describes the stress at which a structure will begin to show brittle deformation or fracturing. Thermal conductivity is a material property that describes the ability to conduct heat. Advantageously, because the open unit cells of the invention may comprise air, the effective thermal conductivity of the components may be increased or decreased by the open-air channels that may run the length of the component.

Advantageously, unit cells in the component may have anisotropic material properties selected from the list consisting of compression modulus, shear modulus, Poisson's ratio, yield strength, crush strength, or crush force efficiency, or thermal conductivity. The plurality of unit cells together may provide more isotropic material properties to the component than the anisotropic unit cell for the at least one material property.

Unit cells in the component may have defined values for material properties selected from the list consisting of compression modulus, shear modulus, Poisson's ratio, yield strength, crush strength, or crush force efficiency, or thermal conductivity. The plurality of unit cells together may provide a greater value to the component than the unit cell for the at least one material property.

Gradations in material properties, for example stiffness, strength, Poisson's ratio, and energy absorbance, may be engineered by selecting intersecting polygonal planes of material to adjust a material property.

When the component is subject to a sufficient impact, the component may irreversibly absorb kinetic energy. Irreversibly absorbing energy means the component exhibits a permanent change to a physical property. Kinetic energy is energy which a body or structure possess by virtue of being in motion. A component irreversibly absorbs kinetic energy, for example, when the component is subject to sufficient impact (kinetic energy) and the polygonal planes of the unit cells, the core, or a cladding layer of the component exhibit plastic deformation in response to the kinetic energy. Irreversible energy conversion from kinetic energy to inelastic energy may comprise one or more of brittle fracture, plastic distortion, or viscous losses.

The component, core, and unit cells may be formed by any known manner. For example, the core may comprise a plurality of stacked, non-planar sheets that form the unit cells. A non-planar sheet is a sheet that comprises a three-dimensional property. The non-planar sheets may be stacked together to form the intersecting polygonal planes of the unit cells.

The component, core, or unit cells can be formed in an additive process or molding process. An additive process or additive manufacturing process is a process in which material is added, for example layer by layer or unit by unit, to manufacture the structure. A molding process is a manufacturing process in which a pliable raw material is forced into a shape through the use of a rigid frame, mold, or matrix.

The additive process may be 3D printing. In 3D printing, material is joined, often under computer control, to create a three-dimensional object with material being added together, most frequently layer by layer. The additive process may be injection molding. Injection molding is a manufacturing process for producing a structure by injecting molten material into a mold and then solidifying the material, for example by cooling the material.

The molding process may be thermoforming. Thermoforming is a manufacturing process in which a sheet of material is heated to a pliable forming temperature and then formed to a specific shape in a mold. The molding process may vacuum forming. Vacuum forming is a version of thermoforming in which a sheet of material is heated to a forming temperature, expanded over a mold, and forced against the mold by a vacuum. The molding process may be pressure forming. Pressure forming is a manufacturing process in which a sheet of material is forced against a mold through the use of pressure on opposite sides of the sheet to form a shape. Pressure forming may also use a vacuum as a source of pressure or in addition to another source of pressure to force the material against the mole.

The component, core, or unit cells may also be formed by a folding or a cutting process. A folding process is a manufacturing process in which pressure is applied to a material at a certain vertices to fold the material. A design algorithm may be used to determine kinematic deformations associated with a vertex that occurs. The folding process may start with a rigid plate and each vertex is selected to generate a highly constrained system, with the interplay between the geometric characteristics giving rise to the resulting structure.

The material may be folded at a plurality of defined locations and defined angles to form a shape. A cutting process is any manufacturing process in which material is removed from a structure to form a final shape.

Additive processes are advantageous for forming structures from non-developable materials that are more difficult to manufacture from flat sheets of material. Components formed from additive processes may have the advantage of being stronger and stiffer.

The component, core, or unit cells may be formed by a mixed process comprising an additive process or a molding process and a folding process or a cutting process. For example, material may first be folded into a defined shape and then a cutting process used to remove material to form a final shape. An additive process or molding process may be used to form a defined shape and a cutting process may be used to remove material to form a final shape. An additive process may be used to form material into a shape that may then be folded by a folding process into a final shape.

Figure 15:
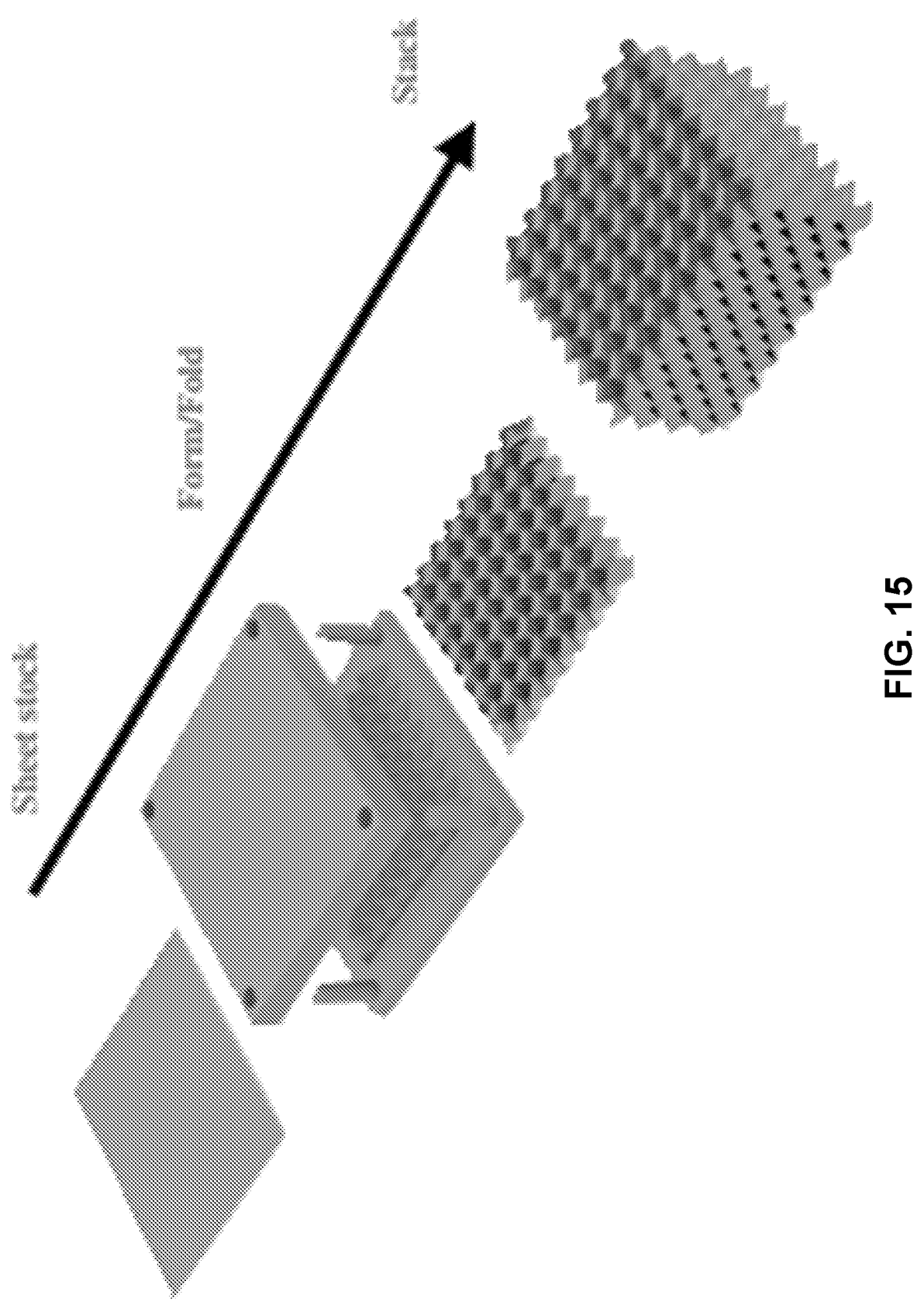
FIG. 15 depicts a form/fold/stack process for manufacturing components.

FIG. 15 depicts a process for manufacture of the components of the invention comprising a sheet of material. The sheet of material is placed into a mold that then forms or folds the material into a layer of unit cells. The layer of unit cells is then stacked through an additive process to form a component.

The components and panels of the invention provide a lightweight material with improved energy absorption. Moreover, because the components comprise a core comprising open unit cells comprising open space, the components require less material than the same amount of material over the same volume. Accordingly, components of the invention provide the advantage of greatly reducing the costs of providing components for various uses. For example, the components and panels may be used as panels for trailer or semi-trailer trucks, wall-panels, ceiling panels, floor paneling, subfloor paneling.

Advantageously, because the components and panels of the invention are lightweight, they may be used in manned and unmanned vehicle paneling, for example aircraft paneling. The components and panels of the invention may be used in helicopter paneling, small aircraft paneling, and commercial airline paneling.

Unmanned vehicles often require electric battery technology that requires active thermal regulation during steady-state operations, which effectively acts as a parasitic power drain. Expanding battery capacity adds significant weight to vehicles, demanding greater lightweighting across the rest of the vehicle design to compensate. Advantageously, components of the present invention provide lightweight components useful for unmanned vehicles.

In manned vehicles, components of the invention can be used in crush tubes, crash cans, and crumple zones as structural countermeasures designed to prevent passenger cabin intrusion. The components may be varied to dissipate kinetic energy based on the size of the vehicle, likely crash conditions, and geometry of the vehicle. For example, larger vehicles may have a substantial amount of subfloor, leading to a large distance that may be utilized to increase the energy absorbed during a crash. The components may be designed to be incorporated into crushable materials in the subfloor of an aerial vehicle. For smaller aerial vehicles or vehicles without a subfloor region, the components may be incorporated into deployable impact absorbing devices external to the vehicle. The structure may comprise a foldable structure designed to fold under the vehicle until a crash is imminent.

The components may be used in crush tubes. The amount of energy absorbed in a crush tube is highly sensitive to the deformation of the failure mode activated during an impact. For example, concertina failure mode and progressive folding diamond failure mode may be exhibited by crushed cylindrical tubes. This stress focusing leads to energy absorbed by plastic deformation. However, which deformation mode is activated, and therefore the amount of energy absorbed by plastic deformation, varies depending on the specific details of the crash itself. As a result, crush tubes have relied on impact angle, failure mode, and cross-sectional geometry to absorb maximal energy from a collision.

The components of the present invention provide the advantage of providing open unit cells and a core that is insensitive to geometric imperfections. The components of the present invention may be robustly activated in crash conditions. For example, the component may provide a strong mechanical coupling between stretching and bending of the intersecting polygonal planes of the unit cells of the core, advantageous for use in crush tubes.

EXAMPLES

Sandwich Panels for Trailers

Provided is a sandwich panel according to embodiments of the invention suitable for use in the paneling of trailers and semi-trailers.

Figure 16:
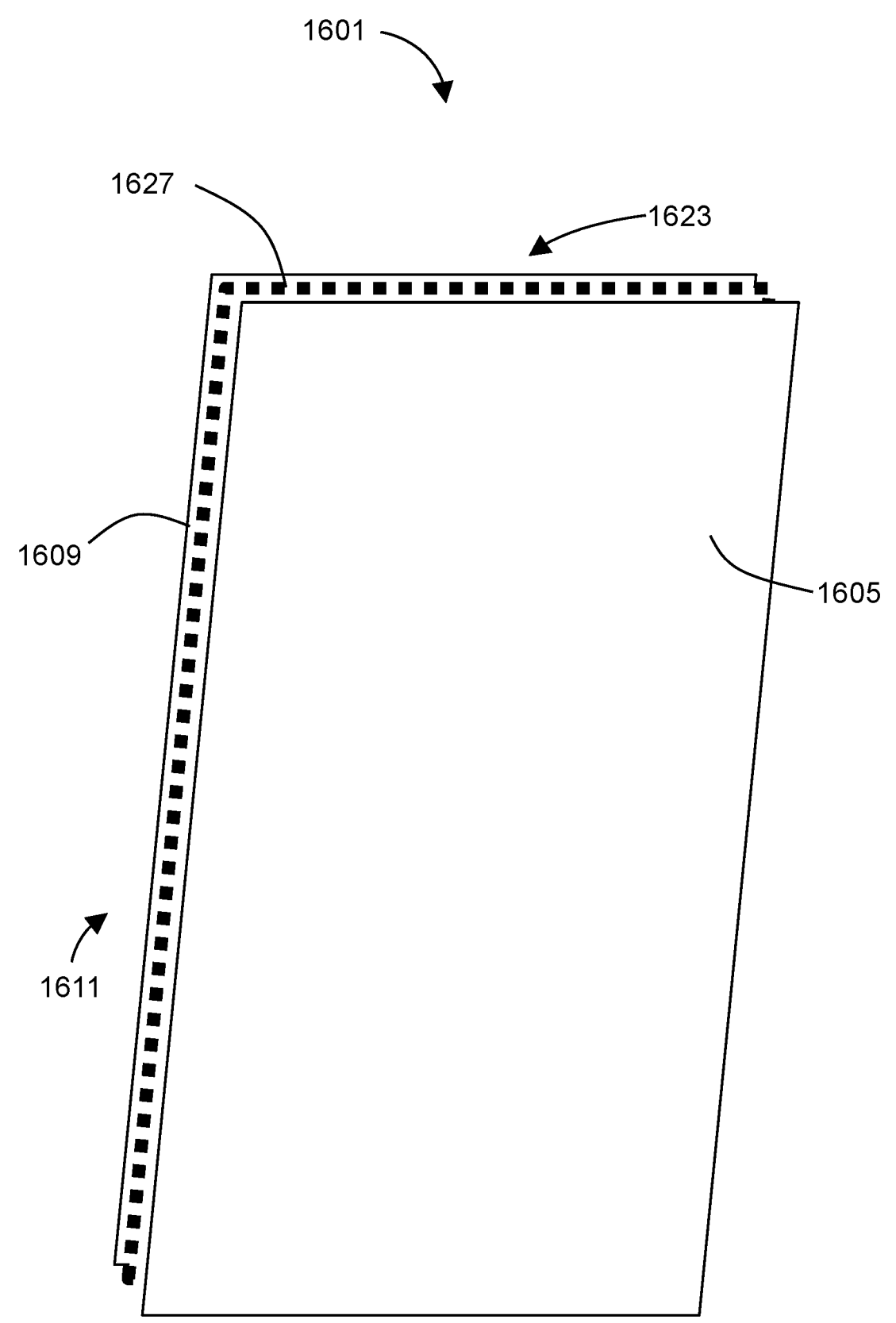
FIG. 16 shows a panel of certain trailer panel embodiments.

FIG. 16 shows a panel 1601 as described. The panel 1601 has an outside first side 1605 and an inside second side 1609, opposed to the first side. The panel 1601 further has a long edge 1611 defining a length l of the panel 1601 and a short edge 1623 defining a width w of the panel. The panel 1601 may be square, i.e., the long edge 1611 and the short edge 1623 may be the same, i.e., l=w, and those labels are for convenience. The panel has a thickness t.

The width along the short edge 1623 of the panel 1601 provided in the embodiment may be approximately 1.22 meters and the length along the long edge 1611 is approximately 3.05 meters, which dimensions are suitable to provide a single panel for a trailer of semi trailer. It is understood that the dimensions of the panel may be altered and adjusted depending on the size, shape, and purpose of the trailer.

The sandwich panel may comprise a cladding layer covering the outside first side 1605 of the panel, intended to face the exterior of a trailer, and a cladding layer covering the inside second side 1609 of the panel, intended to face the body of the trailer. The cladding layers may each be made of single sheets of aluminum or steel. Each cladding layer may be brushed, polished, and/or waxed to provide a smooth watertight exterior surface to the sandwich panel. Advantageously, the cladding layer facing the exterior of the trailer 1605 is made watertight to prevent decline in the sandwich panel from exposure to environmental factors. Each cladding layer may be approximately 0.33 mm in thickness. Each cladding layer has a long edge defining a length/and a short edge defining a width w that is approximately the same as the length and width of the sandwich panel.

Disclosed between the sandwich panels is a core 1627 comprising a plurality of repeats of an open unit cell. Each unit cell comprises intersecting polygonal planes of material and open space, and together the plurality of open unit cells promote an isotropic specific energy absorption of the component. The core 1627 also has a long edge defining a length/and a short edge defining a width w that is approximately the same as the length and width of the sandwich panel. In addition to providing strength and loading bearing capacity, the core 1627 increases thermal insulation of cargo and promote impact absorption in the event of a collision.

Each unit cell may be substantially cubical with a width, length, and height of approximately 0.08 cm. The core 1627 may have a thickness between 0.25 cm to 2.54 cm. For example, for a 0.25 cm thick core comprising cubical unit cells with a width of 0.08 cm, three adjacent unit cells would form the thickness of the core at a single point. For a panel having a long edge of approximately 3.05 meters, approximately 3812 adjacent unit cells would form the long edge of the core of the panel. For a panel having a short edge of approximately 1.22 m, 1525 adjacent unit cells would form the short edge of the core of the panel. With a thickness of 0.25 cm, the core of the sandwich panel would comprise approximately 17,440,000 unit cells. It is understood that the size of an individual unit cell may be adjusted, resulting in a greater number of unit cells along the desired length, width, and thickness of the core.

The unit cells of the core may be any one of the "Eggbox", "Waterbomb", or "Miura-ori" unit core configurations.

For example, FIG. 3 depicts an "Eggbox" configuration of open unit cells that may be used in the core of the sandwich panel. The "Eggbox" configuration is highly compressible in two directions and has a large stiffness when loaded in a third direction.

FIG. 4 depicts a "Waterbomb" configuration of an open unit cells that may be used in the core of the sandwich panel. This configuration yields a core and component with a high stiffness-to-weight, high stiffness overall, and a very low density.

FIG. 5 depicts a "Miura-ori" configuration of an open unit cells that may be used in the core of the sandwich panel. Advantageously, the design parameters of this configuration may be varied to yield small individual unit cells to form a tightly bound core.

FIG. 6 depicts a "topological metacomb" configuration of an open unit cells that may be used in the core of the sandwich panel. This configuration provides a hexagonal structure, similar to honeycomb structures, however with webbing incorporated into the hexagonal structure to create an elastically polarized material. The configuration provides directional stiffness unlike honeycomb structures. The configuration may be capable of retaining its mechanical properties even when damaged. For example, the configuration may cause one edge of the structure be stiff, while the opposite side is compliant.

Advantageously, for each of unit cells for the core of the sandwich panel, when the component is under stress, one or more of the polygonal planes of the unit cells exhibit rigid body rotation before they exhibit plastic deformation, providing strength and loading bearing capacity greater than would be provided by honeycomb-based panels of similar dimensions and density with a core consisting of hexagonal tubes.

FIG. 12 is a graph of the specific energy absorption (SEA) of specific configurations of the unit cells in comparison to honeycomb-based materials. The "Eggbox" configuration, labeled B, achieves a large maximum SEA and isotropic energy absorbance. The "Waterbomb" configuration, labeled C, achieves a large maximum SEA and isotropic energy absorbance. The "Miura-ori" configuration, labeled D, achieves a large CFE and greater isotropic energy absorbance than honeycomb-based materials. Accordingly, in aspects of the invention, the core of the sandwich panel provides a greater maximum SEA, isotropic energy absorbance, or CFE than honeycomb-based material.

The core 1607 may advantageously made using an additive process, molding process, folding process, cutting process, or a mixed process. For example, the additive process may be one of 3D printing or injection molding and the molding process is one of thermoforming, vacuum forming, or pressure forming. The 3D printed structure may then be further adapted by folding or cutting to form individual unit cells.

Different configurations of unit cells may be preferably formed from varying processes. For example, the "Eggbox" design may advantageously manufactured through a cut/fold/stack process. The "Waterbomb" design may advantageously manufactured through a cut/form/stack process. The "Miura-ori" design may advantageously manufactured from a fold/form/stack process.

In the process, the core may be 3D printed by an industrial 3D printer, for example the 3D printer sold under the trade name BUILDER EXTREME 2000 PRO as sold by Builder 3D Printers B.V., headquartered In Noordwijkerhour, Netherlands or the 3D printer sold under the trade name MODIX BIG-120X, as sold by Modix Modular Technologies LTD, headquartered in Raman Gan, Israel.

The core of the sandwich panel may advantageously be formed of aluminum or thermoplastic polyurethane. In such aspects, shredded aluminum flakes or melted thermoplastic polyurethane may be fed into a material storage portion of the 3D printer. A selected process for forming an "Eggbox", "Waterbomb", or "Miura-ori" design, or a precursor thereof, may be input into the 3D printer through a processor and accompanying software. The 3D printer may then begin feeding the material from the material storage portion to a printing portion of the 3D printer to being forming the core in individual stacked layers to form polygonal planes and open space. After 3D printing, the stacked layers may either form the desired configuration, or additional folding or cutting, for example through the use of designed machinery, may be used to form the final desired core configuration.

The core may also be printed and formed in parts. For example, for a 1.22×3.05 m panel, the core may be formed in two parts each 0.61×1.53 m. The two parts of the core may then be fused or bonded to form a single core. The cladding layers may then be bonded to each surface of the core, for example through an adhesive or fusing the sandwich panel to the core. For example, the adhesive may be a polymer, for example a glue or epoxy, or a cement. Advantageously, the cladding layers provide additional structural support to the sandwich panel but also provide additional environmental protection and durability to the core.

Once the cladding layer is bonded to the core to form the sandwich panel, the sandwich panel may then be connected to adjacent sandwich panels of the same design, for example using interlocking lap joints and rivets spaced every 2 inches to form a trailer or semi-trailer "box." The box formed, for example, may be about 16.15 meters in length on each side of the trailer and about 2.8 meters in height, connected to the lower rail and roofing trailer systems using industry-standard interlocks. For example, when using sandwich panels of dimensions 1.22×3.05, 12 adjacent connected panels would be used to form each side of the trailer. Doors with industry-standard hinges may be added.

Advantageously, the panels described may have a density of approximately 3.6 to 6.8 kg/m$^2$ and a stiffness of approximately 1 to 5 kPA-m$^3$, providing a superior properties for paneling in trailers and semi-trailers in comparison to either solid aluminum panels or honey-comb based panels with similar dimensions. Accordingly, in aspects of the invention, the sandwich panels may be further be designed to have a density between 2 to 10 kg/m$^2$. The sandwich panels may also be further designed to have a stiffness between 1 to 5 kPA-m$^3$.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A component comprising:
   a core comprising a plurality of repeating open unit cells, each open unit cell of the plurality of repeating open unit cells comprising intersecting polygonal planes of a material and an open space, wherein the plurality of repeating open unit cells provides an isotropic specific energy absorption to the component;
   wherein each open unit cell of the plurality of repeating open unit cells includes a through hole that extends from a first side of the each open unit cell to a second side of the each open unit cell;
   wherein, when the component is under stress, one or more of the intersecting polygonal planes of the plurality of repeating open unit cells exhibits rigid body rotation before exhibiting plastic deformation;
   wherein each open unit cell of the plurality of repeating open unit cells comprises three mutually orthogonal planes of symmetry;
   wherein an arrangement of the intersecting polygonal planes is varied to provide at least one unit cell of the plurality of repeating open unit cells, in isolation, with an anisotropic material property; and
   wherein the anisotropic material property comprises thermal conductivity, crush force efficiency, Poisson's ratio, compression modulus, shear modulus, yield strength, or crush strength.

2. The component of claim 1 further comprising:
   a cladding layer extending over a surface of the core.

3. The component of claim 2, further comprising a second cladding layer extending over a second surface, opposed to the surface.

4. The component of claim 2, wherein the material comprises and/or the component comprises a metal, plastic, fibrous pump, carbon-fiber reinforced plastic, glass-fiber reinforced plastic, carbon-fiber reinforced metal, ceramic, or a multi-material composite.

5. The component of claim 4, wherein the cladding layer comprises a different material than the core.

6. The component of claim 2, wherein the core is formed by a mixed process comprising an additive process or a molding process and a folding process or a cutting process.

7. The component of claim 6, wherein the core is coupled to the cladding layer by a fusing process.

8. The component of claim 2, wherein the core is coupled to the cladding layer.

9. The component of claim 2, wherein the core is coupled to the cladding layer by adhesion.

10. The component of claim 1, wherein the component has a higher crush force efficiency than for a honeycomb-based panel of similar dimensions and density with a core consisting of hexagonal tubes.

11. The component of claim 1, wherein the component is formed as a rectangular panel.

12. The component of claim 1, wherein the plurality of repeating open unit cells are oriented within the component to provide different material properties to the component than material properties of any one open unit cell of the plurality of repeating open unit cells.

13. The component of claim 12, wherein the plurality of repeating open unit cells are oriented within the component to provide at least one isotropic material property to the component, wherein the at least one isotropic material property comprises compression modulus, shear modulus, Poisson's ratio, yield strength, crush strength, crush force efficiency, or thermal conductivity.

14. The component of claim 1, wherein the core comprises a plurality of stacked, non-planar sheets that form the plurality of repeating open unit cells.

15. The component of claim 1, wherein when the component is subject to a sufficient impact, the component irreversibly absorbs kinetic energy.

16. The component of claim 1, wherein the core can be formed in an additive process or molding process.

17. The component of claim 16, wherein the additive process is one of 3D printing or injection molding and the molding process is one of thermoforming, vacuum forming, or pressure forming.

18. The component of claim 1, wherein the core can be formed by folding or cutting the material to form the core.

19. The component of claim 1, wherein the component is a panel of a trailer of a semi-trailer.

20. The component of claim 1, wherein the component has a yield strength relative to a yield strength of the material over a same volume that follows the formula:

$$\delta_{ys}(\rho^*/\rho_s)^x$$

wherein $\delta_{ys}$ is the yield strength of the material over the same volume, $\rho^*$ is an effective density of the component, $\rho_s$ is a density of the of material over the same volume, and x has a value between 1 and 2.

21. The component of claim 1, wherein the intersecting polygonal planes are arranged such that sector angles of the intersecting polygons within a unit cell of the plurality of repeating open unit cells sum to 360 degrees, wherein the unit cell is planar when unfolded and allows for rigid rotation of the planes without plastic deformation of the material.

22. The component of claim 1, wherein the plurality of repeating open unit cells comprises first open unit cells having a first shape and second open unit cells having a second shape, wherein the first shape is different from the second shape.

23. The component of claim 1, wherein the material forming the intersecting polygonal planes of the plurality of repeating open unit cells comprises a first material and a second material, the first material being different than the second material, wherein the plurality of repeating open unit cells comprises first open unit cells formed of the first material and second open unit cells formed of the second material.

24. The component of claim 1, wherein each of the plurality of repeating open unit cells has a same size, shape, and geometry.

25. The component of claim 1, wherein the material forming the intersecting polygonal planes of each of the plurality of repeating open unit cells is the same material.

26. The component of claim 1, wherein each open unit cell of the plurality of repeating open unit cells comprises a Miura-ori shape.

27. The component of claim 1, wherein each open unit cell of the plurality of repeating open unit cells comprises a shape other than a Miura-ori shape.

28. The component of claim 1, wherein the intersecting polygonal planes are arranged such that sector angles of the intersecting polygons within a unit cell of the plurality of repeating open unit cells do not sum to 360 degrees.

* * * * *